United States Patent [19]

Covell, III

[11] Patent Number: 4,944,068
[45] Date of Patent: Jul. 31, 1990

[54] POULTRY SCALDER, SCALDING SYSTEM AND PROCESS

[76] Inventor: Edward H. Covell, III, 919 Riverside Dr., Salisbury, Md. 21801

[21] Appl. No.: 427,484

[22] Filed: Oct. 27, 1989

[51] Int. Cl.⁵ .............................................. A22C 21/04
[52] U.S. Cl. .......................................... 17/11.2; 17/51
[58] Field of Search .................... 17/11.2, 51, 1 E, 11, 17/44.1, 47, 15

[56]  References Cited

U.S. PATENT DOCUMENTS

| | | | |
|---|---|---|---|
| 2,667,661 | 2/1954 | Long | 17/11.2 |
| 2,879,540 | 3/1959 | Van Ness | 17/11.2 |
| 3,474,490 | 10/1969 | Groover et al. | 17/1 E |
| 3,564,645 | 2/1971 | Brugman | 17/1 E |
| 3,828,397 | 8/1974 | Harben, Jr. | 17/1 E |
| 4,868,950 | 9/1989 | Harben, Jr. | 17/11.2 |

Primary Examiner—Willis Little
Attorney, Agent, or Firm—Watson, Cole, Grindle & Watson

[57]  ABSTRACT

A poultry scalder, process and system of the immersion poultry scalding employs counterflow recirculation of scald liquid in a counterdirection to that of the travel of the poultry through the immersion tank. The tank liquid is counterflowed externally in stages from the bird exit station through one or more intermediate stations and to the bird entrance station, and the liquid removed from the tank is filtered, cleaned and sanitized with make-up water being added to the system being heated to scald temperature before it is returned to the immersion tank. Steam injection is introduced externally to the scalder via external pumping conduits employed for the staged counterflow.

23 Claims, 2 Drawing Sheets

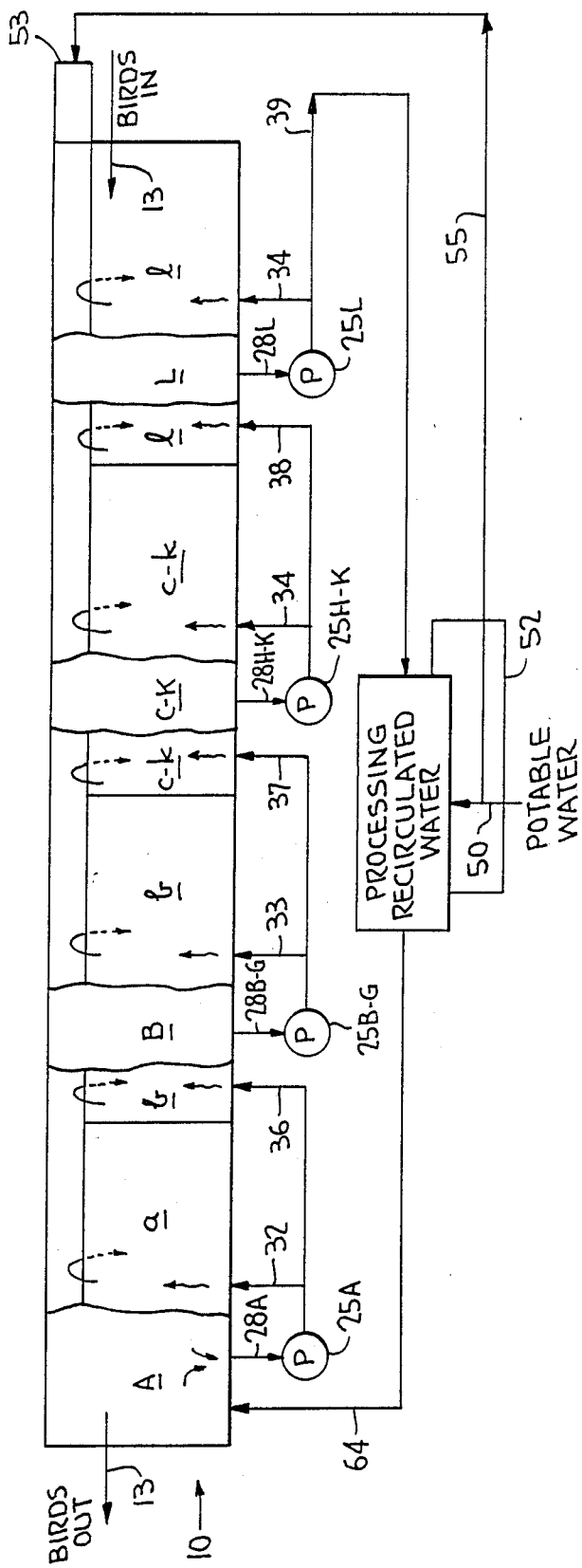
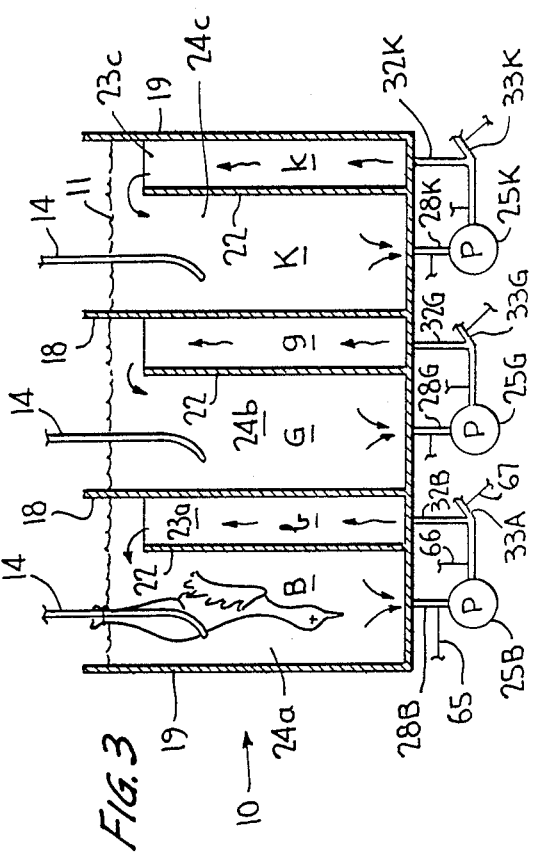
FIG. 2
FIG. 3

POULTRY SCALDER, SCALDING SYSTEM AND PROCESS

RELATED PATENT AND APPLICATION

This application relates to my U.S. Pat. No. 4,852,215, dated Aug. 1, 1989, and to my U.S. Ser. No. 07/427,484, filed Oct. 11, 1989 entitled "POULTRY SCALDING SYSTEM." The entirety of both disclosures are specifically incorporated herein by reference.

BACKGROUND OF THE INVENTION

This invention relates generally to a poultry immersion scalder, scalding system and process in which poultry is coveyed in an open immersion tank containing scalding liquid as the conveyor moves the poultry while hanging by the legs. More particularly, the poultry is conveyed in one direction through the tank, and the scalding liquid is drawn from the tank and returned to flow in a direction opposite the poultry conveying direction, the liquid thus recirculated being filtered and additional liquid being added and heated before being returned to the immersion tank.

More particularly, the invention provides for means external to the tank for counterflowing the scald liquid in stages.

For a typical start-up operation of immersion scalders, the immersion tank is filled with clean water and heated to the desired scald temperature. The water can be heated by live steam injection, by steam passing through heat exchange plates in the immersion tank or by hot air and steam injection into the scald water. During operation approximately one quart of clean tap water is added for every bird moving through the immersion tank. The make-up water is usually at ground temperature, i.e., 65° F. to 70° F. The birds pass through the scald (immersion) tank for 8–16 hours per day. Counting work breaks the water can be 18 hours old when the last bird exists the scalder.

The fresh make-up water of about one quart per bird helps maintain the water level in the immersion tank as the birds carry water out in their feathers. Also, the U.S.D.A. normally requires an overflow of water from the scald tank. This provides some dilution of the contaminated water but has very little effect. The cold add water is sometimes added to the tank at a concentrated location, but is normally added through a perforated pipe extending along the scalder for dissipating the cold make-up water so as not to create cold spots in the tank which could defeat the purpose of the scalder.

The flow of water in a scalder allows water to be mixed during conveyance of the poultry along adjacent conveyor runs as the birds travel in opposite directions relative to one another. The flow of water is not directed in a controlled path nor in any purposeful direction other than downward onto the bird.

The typical immersion scalder presents considerable cross-contamination problems. A bird having very little bacteria will pick up bacteria in the water from birds that have passed before it. In many cases bacteria types may be introduced into the bird that it does not have until it is immersed in the scalder.

As well known, a scalder is utilized as part of a poultry processing operation so as to heat the skin of the bird to loosen the feathers allowing the feathers to be plucked at a station after the birds leave the scald tank. The bird's feathers act as insulation preventing heat from reaching the skin.

In immersion scalding the birds are carried by an overhead conveyor hanging by the feet and are immersed in a hot bath of water. The water is heated and then agitated by air injection in the bottom of the scalder or by pumps moving large volumes of water that flow over the birds. During the scalding process the skin and feathers are heated by the heat transfer of hot water (124° to 142° F.) into the bird.

Immersion scalders are also known which utilize live steam injection for heating the water to loosen the feathers for subsequent plucking. However, since the scalder tank is open significant steam blow-by from the top of the scalder is experienced with such live steam injection scalders. This steam reaches the surface of the scald water before it completely dissipates into the water.

Factors that contribute to scalding are temperature and time. For a hard scald, higher water temperature could mean less time in the scalder for the heat transfer required to loosen the feathers. This is limited, however, because at temperatures as high as 142° F. the bird may cook. For this reason it is not possible for scald water to be heated sufficiently high to kill many types of bacteria.

Also it takes more time to soft scald the bird than it does for a hard scald. Soft scald is used when the preferred end product is a yellow bird. The outer layer of skin which carries the yellow, color is easily overheated and will if overheated be removed from the bird in the pickers along with the feathers. For this reason the temperature is lower than hard scald, although bacteria of many types cannot be killed by the low temperature of the water.

Other factors contributing to temperature and time are bird health, rigor mortis, the Ph of the water, the poultry breed, the weather, the type of immersion scalder, the picking system, the type of kill cut and bleed time.

The soft scald temperature of broiler chickens is about 124 to 130° F., with an average of 127 to 128° F. The hard scald temperature of broiler chickens is between about 130° to 140° F. Turkeys are always hard scalded at a temperature between 137° to 140° F. And, the make-up water for immersion scalders usually amounts to one quart per bird for chickens and one half gallon per bird for turkeys.

The scalder tank is normally constructed to direct the flow of water downwardly onto the birds being conveyed through the tank. Most scalders have agitators with props at the tank bottom to move the water in a direction flowing upwardly and then downwardly onto the birds being conveyed. Normally, several conveyor passes are provided and are separated by partition walls which allow water from different conveyor passes to be intermixed thus, while the birds are moved in opposite directions relative to one another while traveling along adjacent passes, they are cross-contaminated with bacteria remaining in the scalded water.

In accordance with the counter flow principle disclosed in my prior patent, the flow of water in the scalder tank is counter to the direction the birds are conveyed through the tank. The sanitized water enters the scalder at an exit location of the birds. The contaminated water exits the scalder at the entrance location of the birds. As each bird travels through the scalder, it would be moving into cleaner water all the time.

As the birds are conveyed through the scalder, they drag water with them, thus creating high and low areas at the water level as the water swells. The tank must therefore be of a sufficient width and depth to assure that the birds are sufficiently immersed in the scald water for effective scalding.

Moreover, the agitators normally employed for directing the flow of water downwardly onto the birds being conveyed through the tank must effect sufficient agitation to push down the birds from the top of the tank and to create an undertow from the tank bottom to maintain the birds under the water level for a given size tank.

An improved scalder tank and counter-flow system to avoid this problem is therefore desirable, as are improvements in steam heating the scald liquid in the tank.

For example, it is known that steam is added by direct injection to the bottom of the scalder or by the provision of heat exchange plates mounted along the sides of the scalder adjacent to the passage of the birds. In a case of live steam injection, steam is added to the scald water at a location beneath the birds or beneath the agitator pumps. In any case, the water must be deep enough for most of the steam to dissipate into the water before reaching the surface of the water, so as to avoid steam blow-by. If the steam is added directly beneath the birds, the tank must also be sufficiently deep for the steam not to burn the birds.

In the case of heat exchange plates, the scalder must be sufficiently wide and/or sufficiently deep for the birds not to contact the hot plates.

SUMMARY OF THE INVENTION

It is therefore an object of the present invention to provide an improved poultry immersion scalder, scalding system and process which avoids the problems experienced with known immersion scalders and which serves as an improvement over my patented counter-flow scalder. As with that scalder, a cross-contamination of the birds is substantially avoided, and the scald water is cleaned as it is filtered and sanitized during recirculation. The system can operate continuously in water which is even cleaner after recirculation. The recirculated water is heated using less energy and less make-up water than before.

In accordance with the improvement, the water dragged by the birds when conveyed through the scalder, plus a volume equal to the recirculated heat treated water, is counter-flowed from the bird exit station to the bird entrance station of the scalder by means external to the tank, such as pumps. Thus, the water is counter-flowed from outside the pass along which the birds travel, so that the scalder may be of reduced width and depth. And, agitation required is far less with the present arrangement than that formerly required to force liquid downward from the top on to the birds, and than that required to form an undertow from the tank bottom to maintain the birds immersed in the scalded water.

A further object of this invention is to provide such as improvement wherein problems are resolved in live steam injection into the scalder by adding steam at the pump conduits external to the tank, thereby avoiding any over scalding or burning of the birds, and to achieve improved dissipation of the steam before reaching the scald liquid surface thereby eliminating steam blow-by while at the same time avoiding overheating the birds.

The still further object is to provide such an improvement wherein the tank liquid is counter-flowed externally of the tank, from and into the bird exit station and an intermediate station, from and into such intermediate station and into the bird entrance station, and from into such entrance station and outwardly of the tank.

A further object is to provide such an improvement wherein the tank has internal flow means defining a chamber into which the liquid is pumped at such stations, and the tank other than such chamber defining a trough in communication with the chamber and along which the poultry is moved through the tank.

A still further object of the invention is to provide such an improvement wherein steam injection means is connected to the pumping means external to the tank to maintain the temperature of the scald liquid in the tank at a predetermined scald temperature, thereby assuring a more complete dissipation of the steam in the tank liquid before reaching the tank surface so as to eliminate steam-blow by.

By screening and filtering the recirculated water a substantial amount of coarse material such as sand and wood chips are removed from the water. In the past with more of these particles in the water the birds were recontaminated as the water passed through the feathers. After the scalding operation the pickers would beat bacteria from these particles into the skin of the birds.

By santitizing the water surface bacteria on the skin will also be lower and there will be less of such bacteria for the picking machines to beat into the birds.

Although the U.S.D.A. requires that an overflow be maintained at the scalder, with the filtering and sanitizing system of the invention less make-up water will be required for the scalder. This translates into less energy used to heat water. And with less tap water used there is a saving of the cost of water in and out of the plant.

The present system will add heat by steam injection as part of the liquid recirculating system.

In accordance with the invention, the flow of water in the scalder tank is counter to the direction the birds are conveyed through the tank. The sanitized water enters the scalder at an exit location of the birds, and is counter flowed in stages through an intermediate location(s) and to the entrance location of the birds at which the liquid is drawn into the recirculation system. As each bird travels through the scalder it will be moving into cleaner water all the time.

The water removed from the tank at the entrance end at which the birds are conveyed into the tank is sanitized as it passes in heat exchange relationship with superheated water and is injected with steam. The heating liquid from the heat exchanger is then combined with fresh make-up water for yielding sanitized recirculating liquid at a predetermined scald temperature before it is returned to the tank at the exit end of the bird conveyor.

The immersion tank may have a shallow water containing head trough at the entrance end of the bird conveyor into which only the heads of the birds are immersed before being more fully immersed in the tank. The make-up water will flow in heat exchange relationship with the sanitized water and will be thereby heated before flowing to the head trough.

Other objects, advantages and novel features of the invention will become more apparent from the following detailed description of the invention.

BRIEF DESCRIPTION OF THE DRAWINGS

FIG. 2 is a side schematic view of the tank and system of FIG. 1; and

FIG. 3 as a cross-sectional view taken substantially along the line 3—3 of FIG. 1.

DETAILED DESCRIPTION OF THE INVENTION

Figure 1:
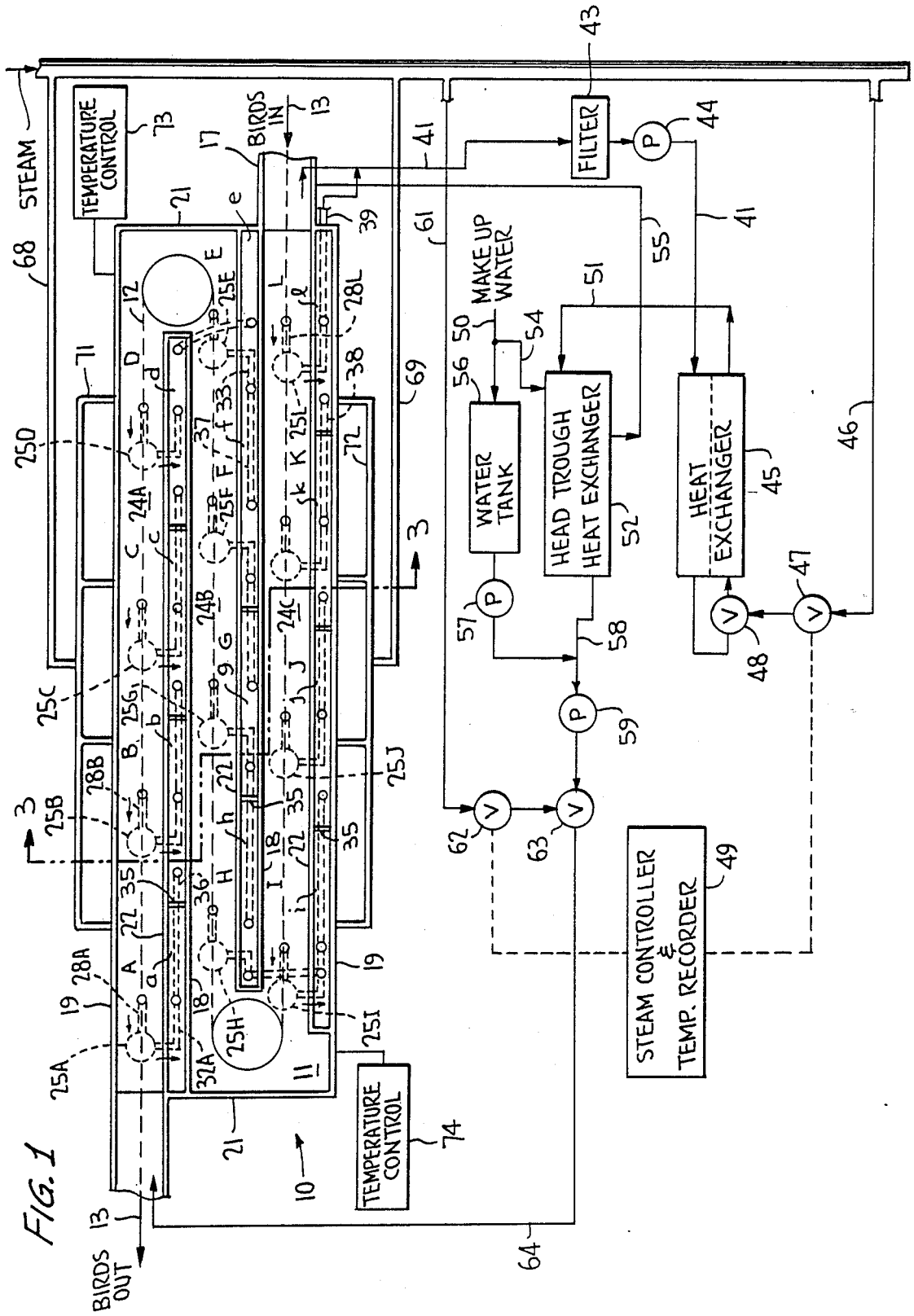
FIG. 1 is a schematic view, in plan, of the scalder tank and scalding system according to the invention.

Turning now to the drawings wherein like reference characters refer to like and corresponding parts throughout the several views, an immersion tank 10 is shown in FIG. 1 for containing scalding liquid 11 at a predetermined scald temperature. A conveyor 12 which may have several runs back-and-forth is positioned above the tank for moving poultry in one direction through the tank shown by arrows 13 in FIG. 1. The conveyor is of known construction having shanks 14 (FIG. 3) suspended therefrom to which the legs of the birds are secured in some manner such that the feathers of the birds are fully immersed in the liquid 11 when dipping downwardly into the liquid upon entering the tank. The conveyor moves the birds from an entrance station L at the tank to an exit station A at the tank in the direction of arrows 13.

The scalder tank has a relatively shallow head trough 17 at entrance station L the trough containing fresh water slightly heated above ground water temperature and supplied in a manner to be described more fully hereinafter. The conveyor may have an elevated section for suspending the birds such that the heads only of the birds are immersed in the fresh head water trough, as set forth in my prior patent. Thus, if the bird is still breathing at this stage of the poultry processing operation it will inhale relatively clean water into its lungs and air sacs. The bird will therefore draw in water having a much lower bacteria count than when immersed in prior systems.

The scalder tank is constructed to direct the flow of water downwardly onto the birds being conveyed through the tank as in the manner illustrated in FIG. 3. The tank may have one or more partition walls 18 depending on the number of conveyor passes designed for the tank. These walls are of substantially the same height as side walls 19 of the tank and end walls 21. And, the tank has internal walls 22 of less height compared to that of walls 18, 19, lying parallel thereto and forming with walls 18 and with one of walls 19, a chamber 23. As seen in FIG. 1, the wall pairs 18, 22 and 19, 22 are closed at their opposite ends, with the internally formed chambers being respectfully spaced inwardly from the end walls of the tank to facilitate the reverse directions of the conveyor.

The tank other than the chambers defines troughs 24 along with which poultry is moved in the direction of arrows 13, troughs 24 communicating with chambers 23.

External liquid pumps 25A to 25L are mounted externally to the tank for drawing liquid from the tank via conduits 28A to 28L, respectively. At trough 24, as seen in FIG. 1, pumps 25A to 25D are associated with trough 24a for drawing liquid from the bottom thereof, pumps 25E to 25H are associated with trough 24b for drawing liquid from the bottom thereof, and pumps 25I to 25L are associated with trough 24c for drawing liquid from the bottom thereof, in a manner to be described more fully hereinafter.

The pumps have branch conduits 32A to 32L for respectively pumping drawn liquid into the chambers such that the liquid in the chambers flows upwardly over the tops of walls 22 and downwardly onto the birds, as agitated tank liquid.

The chambers may be provided with transverse walls 35 for dividing the chambers into section a though 1 respectively associated with exit station A, intermediate stations B to K, and entrance station L.

Additional branch conduits 33A to 33L are respectively associated with the pumps.

The external pumps and pump conduits operate to counter flow the tank liquid in stages from the exit station through the intermediate stations and to the entrance station and thereafter outwardly of the tank as will be described. In such manner, tank liquid is pumped in an upstream direction relative to the direction of movement of the birds.

Pump 25A pumps the liquid from station A via 28A and into chamber section a via 32A, as well as into chamber section b via 33A. Pump 25B pumps the liquid from intermediate station B via 28B, into chamber section b via 32B and into the upstream chamber section via 33B. And, the pumps at the remaining intermediate stations pump liquid with from those stations into the associated chamber sections at each such station and into each upstream chamber section at each upstream tank station. At intermediate station K, pump 25K functions in the same manner except that its branch conduit 33K pumps liquid into chamber section 1 at entrance station L. Finally, pump 25L pumps liquid from the tank at station L, into chamber section 1 and outwardly of the tank via conduit 39.

The bacteria contaminated water exiting conduit 39 at bird entrance station L flows via conduit 41 through a filtering station 43 at which wood chips, sand and other particles removed from the birds while in the scalder will be filtered from the removed scald water. The filtering will help maintain heat exchange as used in the present system clean and operating at the highest efficiency. And, by filtering these particles from the removed scald water, it will be assured that a reduced amount of such particles will cling to the birds before exiting the scalder. Thus, the pickers will not beat as much of this foreign material into the skin of the birds during the subsequent poultry operation.

The filtered liquid through conduit 41 is pumped via a pump 44 through a heat exchange 45. The heat exchanger is fed with, for example, recirculated water heated via a steam conduit 46 connected to a steam valve 47 and a steam/water valve 48. A suitable steam and temperature controller 49 may be set for operating valve 47 to maintain the temperature of the superheated water to a desirable level.

The filtered liquid from conduit 41 is typically at the same scald temperature of a 128° F. as that in immersion tank 10. This filtered liquid flows through heat exchanger 45 and into a water-steam mixing valve with the live steam controlled set at the superheated temperature. This heat exchanger is constructed in a normal manner having a plurality of heat exchange plates effecting heat exchange between the oppositely directed flow of liquid, such that the filtered liquid increases in temperature as the superheated liquid decreases in temperature during this heat exchange, and the heating liquid at the exit end of the heat exchanger flows into conduit 51 at a predetermined temperature of about 130° F., for example, which can be maintained by the heat exchanger and the controller 49.

The injected steam functions to kill the bacteria in the filtered water as BTU's are added and the water temperature rises. The superheated recirculated water will then exit through heat exchanger 45 passing off heat to the incoming filtered water so that this completes the loop of the bacteria killing segment of the system.

The still very warm liquid in conduit 51 then passes through another heat exchanger 52 provided trough 17 with the conveyor arranged relative thereto in the same manner in my prior patent for immersing the heads only in the tank liquid before being fully immersed in the main portion of the tank.

Potable water, typically at a temperature of about 65° F., is supplied at 50 from a source (not shown) through conduit 54 to heat exchanger 52 and exits through conduit 55 after passing in heat exchange relationship with heating liquid flowing from conduit 51 through heat exchanger 52. Heat exchanger 52 is constructed so as to elevate the temperature of the ground water to about 90° F. after passing therethrough in heat exchange relationship with the heating liquid. The liquid in conduit 55 flows into shallow head trough 17 as fresh water which will overflow into the main portion of the immersion tank. This fresh water will be part of the fresh potable ground water required to be added to the immersion tank for replenishing any loss of liquid from the tank as carried out by the birds and for maintaining scalder tank overflow if desired. The heads only of the birds are immersed in the head trough containing clean water. Thus, should the birds still be breathing at this stage of the poultry processing operation, they will inhale relatively clean water into their lungs and air sacs. The birds will thereafter draw in water at a much lower bacteria count compared to prior immersion scalding systems.

It should be pointed out that some plant operations may not require or desire a head trough, in which case the head trough and/or its heat exchanger may be eliminated from the system without departing from the invention.

The potable ground water used as make-up water for the system likewise flows into a potable water holding tank 56 and is pumped via pump 57 into a conduit 58 through which the heating liquid exits heat exchanger 52. A recirculation pump 59 feeds the mixture of heating liquid and potable liquid in conduit 58 through the system. The temperature of the mixed liquid is maintained at the desired level via steam injection or the like, as through a branch conduit 61 passing through a suitable valve via 62 to a steam-water mixing valve 63. The temperature is maintained at the desired level by control 49 which may regulate valve 62. The mixture of heating liquid and potable water in conduit 58 is heated to the scald temperature which may be 128° F., so that the liquid in conduit 64 is returned to immersion tank 10 at exit station A for recirculating scald liquid at the scald temperature through the tank in the direction opposite the direction of travel of the birds. The sanitized recirculating liquid being returned to the immersion tank through conduit 64 is substantially free of bacteria and includes make-up water which is heated partially by the heating liquid flowing through conduit 58 and supplemented by steam injection via branch conduit 61, so that cleaner water is recirculated through the immersion tank with the present system at a rate which may, for example, be about equal to the liquid volume of the immersion tank liquid in 30 minutes.

Live steam may also be injected into one or more of the external conduits associated with the pumps as at 65, 66 and/or 67. The live steam is conducted via branch conduits 68, 69 and via manifold branches 71, 72, to assure maintenance of liquid 11 in tank 10 at the desired scald temperature. Temperature control units 73, 74 may be provided for sensing and regulating the temperature of liquid 11 in combination with valving (not shown) in branch lines 68, 69. However, unlike prior systems, the steam is injected indirectly into the tank via the external pump piping so as to avoid overheating the birds, and avoiding steam blow-by in that the steam will be fully dissipated before reaching the liquid surface. The scalder tank may thus be made shallower and narrower compared to other scalders.

The energy requirements to heat the make-up water and the BTU's provided for the aforedescribed system by the superheat operation for the counterflow immersion scalding system of the invention, will now be set forth.

The U.S.D.A. normally requires an overflow discharge at the scalder during operation. For this purpose, one quart of water per bird is usually added to the scalder. The bird removes about one pint clinging to its feathers as it exits the immersion tank thus leaving about one pint per bird for the overflow discharge. However, this one pint per bird is such a low volume that it would have little effect on the operation even during counterflow movement at a restricted rate of flow without the application of the present system.

It will be shown that a much greater rate of flow of liquid can be superheated and returned to the immersion tank than is now added at the rate of one quart per bird. This is capable of being achieved with only half the added water presently being used. No overflow discharge would therefore be required.

In the following example there is an established goal of recirculating a volume of water per minute equal to the volume of the immersion tank water in a 30 minute period. Other factors are that the recirculated water is superheated to 175° F. while using a heat exchanger 45 structured to reduce the temperature of the superheated water through heat exchange such that the filtered water flowing through heat exchanger 45 is lowered to a temperature 5° F. higher when it exits the heat exchanger as sanitized heating liquid than when it entered as contaminated scald water.

As other parameters involved in the example, the line speed of the conveyor moving the poultry through the immersion scalder is 140 birds per minute (bpm). The scalder (immersion tank) is of a size allowing a conveyor pass of 140 feet therethrough, the birds being mounted on the conveyor at 6 inch centers thus equaling two minutes of scald time for each bird. The volume of the scalder is 3500 gallons of water, and the temperature of the potable ground water added is 65° F. The scald temperature of the immersion tank liquid is 128° F., and the recirculated water leaving the superheat operation through conduit 51 is 133° F. As will be shown, the rate of the recirculated volume of scald water equal to the volume of the scalder in a thirty minute period of time is 116 gallons per minute.

If one pint of potable water per bird is added to the system via conduit 50 the make-up water is added at a rate of 17.5 gallons per minute (one pint per bird X 140 bpm).

To determine the maximum flow of recirculated sanitized water (through conduit 64) the number of BTU's required to heat up the make-up water must be determined. 17.5 gpm must be heated from 65° F. to 128° F. With the weight of water at 8.345 lb./gal., the following equation applies: (17.5 gpm) (8.345 lb./gal.) (128° F.−65° F.)=9,200.35 BTU's per minute. This is the amount of heat energy required to heat all the make-up water.

The recirculated water leaves heat exchanger 45 at 133° F., and the desired scald temperature is 128° F. Each gallon of recirculated water at 133° F. will have 5° F. of heat that can be used to heat the make-up water. To determine the maximum recirculated and sanitized rate of flow, the following equation applies: 9,200.35 BTU per minute divided by (8.345 lb./gal.) (133° F.−128° F.)=220.5 gpm.

220.5 gallons per minute of recirculated and sanitized water at 133° F. will provide all the heat necessary to heat the make-up water.

For a 3500 gallon capacity immersion tank at a flow rate of 220.5 gallons per minute, the present system is capable of recirculating a volume of water equal to the capacity of the scalder in 15.9 minutes using a make-up water add rate of one pint per bird. And, this has been accomplished with half the normal rate of make-up water. The actual system may be designed to recirculate a volume of water that would be at least equal to the 3500 gallons of water of tank 10 capacity in a 30 minute period which is a rate of 116 gallons per minute.

The foregoing example does not take into consideration the head trough or the head trough heat exchanger 52, such that the potable water added to the system is supplied only through conduit 50.

When the head trough and its heat exchanger 52 are incorporated into the system, the heat exchange taking place in heat exchanger 52 is used to heat up the potable ground water fed via conduit 55 to head trough 17. Assuming the addition of one pint of water per bird to the system (17.5 gpm) as a total amount of water added to maintain the scalder full of water at 140 bpm, and assuming a rate of 3 gallons per minute of make-up water to the head trough via conduit 55, 14.5 gpm (17.5−3 gpm) of make-up water is added via conduit 50. The potable water supplied to the head trough at 3 gpm will be heated from 65° F. to 90° F. which is less than the scald temperature of 128° F. since immersion of only the poultry heads in the head trough for the purpose intended does not require scalding. This heat is transferred from the recirculated water or heating liquid exiting heat exchanger 52 through conduit 58 and flowing through heat exchanger 52 in heat exchange relationship with the potable water likewise flowing therethrough.

To determine the maximum flow of recirculated sanitized water exiting heat exchanger 52 the amount of BTU's required to heat up the make-up water must be determined. 14.5 gpm must be heated from 65° F. to 128° F. The head trough water must be heated from 65° F. to 90° F at 3 gpm. Thus, (14.5 gpm) (8.345 lb./gal.) (128° F.−65° F.)=7,623 BTU per minute. And, (3 gpm) (8.345 lb./gal.) (90° F.−65° F.)=626 BTU per minute, for a total of 8,249 BTU per minute to heat up all the make-up water.

The recirculated water in conduit 51 which exits heat exchanger 45 is at a temperature of 133° F. Since the desired temperature is 128° F., each gallon of recirculated water at 133° F. will have 5° F. of heat that can be used to heat the make-up water supplied. To figure the maximum recirculated flow with 8,249 BTU per minute to heat all the make-up water, 8,249 BTU per minute to heat all the make-up water, 8,249 BTU divided by (8.345 lb./gal.) (133° F.−128° F.)=197.7 gpm. of recirculated water (heating liquid) at 133° F will provide all the heat necessary to heat the make-up water. The recirculated volume, however, need not be this high. BTUs will be added via steam injection through branch conduit 61 to provide the heat to elevate the temperature to 128° F. Thus, to meet the goal of complete recirculated tank 10 volume in 30 minutes only 116 gpm needs to be recirculated. Thus, the system may be designed to recirculate approximately 140 gpm given the aforedescribed parameters.

The foregoing examples were given for soft-scald of chickens, although similar showings can be made for the advantages of the present system for a hard scald chicken scalder and for hard scalding turkeys.

Also, it can be shown that the BTUs required for the present system are substantially less than required for prior art systems. There are cost savings in make-up water expense compared to the cost in otherwise bringing water in and treating the affluent discharge in prior systems. By comparison, scalders using live steam injection utilize more energy to operate compared to the present system. The live steam injector scalders experience significant steam blow-by as the steam reaches the surface of the water in the scalder before it is completely dissipated in the water, and is thereby lost to the atmosphere.

In the present system the BTUs necessary to heat the make-up water will be added at heat exchanger 45 via valve 48 and at valve 63. Thus, no steam will escape to the atmosphere as in the steam injection scalders to heat the added water. Some steam will be added to the scalder as at 65, 66 and/or 67 such that the steam will be fully dissipated before reaching the surface thereby eliminating steam blow-by experienced with live steam injection scalders, and avoiding any overheating of the birds. The present scalder can therefore be shallower compared to typical steam injection scalders, and can be both shallower and narrower compared to prior scalders using internal heat exchange plates given that the birds conveyed in the present scalder need not be distanced from such heat exchange plates as before.

The steam in the present invention is added to the immersion scalder only to replace surface loss and heat absorbed by the birds. The largest requirement for heat is to raise the temperature of the potable make-up water used in the scalding process.

Moreover, the present counterflow system avoids water swells in the tank otherwise created as the birds drag water with them during passage through the scalder. According to the invention the liquid is counterflowed externally of the pass of the travel of the birds, thus assuring that the birds remain fully immersed in the scald liquid without the need to widen the scald tank.

As an example of the present counterflow system, 500 gpm is pumped from exit station A via conduit 28A with 343 gpm being pumped via conduit 32A into chamber section and 157 gpm being counterflowed into the next adjacent chamber section b via conduit 33A.

Assuming that 17.5 gpm is carried out on the birds, 154.5 gpm is pumped into the scalder via conduit 64, 140 gpm is reprocessed water and 14.5 gpm is potable make-up water that was mixed in at the sanitizing portion of the process. 343 gpm is recirculated from station A to chamber section a, and 20 gpm is dragged into station A by the birds. Thus, 500 gpm is added to station A and 500 gpm is pumped out of this station.

Liquid counterflow from each intermediate station B-J, from that intermediate station to the adjoining intermediate station upstream thereof relative to the direction of bird movement, is essentially the same. And, the counterflow from intermediate station K to entrance station L is the same as will be described with reference to the intermediate stations.

First, as a typical example of counterflow from one intermediate to the next and from the last intermediate station K to entrance station L, 500 gpm is pumped from station B via conduit 28B with 343 gpm pumped into section b via conduit 32B, and 157 gpm counterflowed to section c via conduit 33B. Since 157 gpm is counterflowed in from station A, 343 gpm is recirculated from station B to section b. 20 gpm is drag into station B by the birds, and 20 gpm is dragged out of station B by the birds, such that 500 gpm is added to station B and 500 gpm is pumped out of this station.

At the bird entrance station L, 500 gpm is pumped from station L via conduit 28L with 360 gpm pumped into section l via conduit 32L. 140 gpm is pumped via conduit 39 (FIG. 2) into the hot water sanitizing process. 157 gpm is counterflowed in from section K, 360 gpm is recirculated from station L to chamber section 1, 3 gpm of potable water flows to head trough 17 and then to the scald tank, and 20 gpm is dragged out of section L by the birds. Thus, 500 gpm is pumped into station L, and 500 gpm is pumped out of this station.

Obviously, many modifications into variations of the present invention are made possible in the light of the above teachings. It is therefore to be understood that within the scope of the appended claims the invention may be practiced otherwise than as specifically described.

What is claim is:

1. A poultry scalding system comprising, an open immersion tank adapted to contain scalding liquid at a predetermined scald temperature, conveyor means positioned above said, tank for moving poultry in one direction through said tank from an entrance station, through at least one intermediate station and to an exit station at said tank while the poultry is immersed in the liquid as the poultry hangs by the legs from said conveyor means, liquid recirculating means connected to said tank for recirculating the liquid in a direction opposite said one direction during operation of said conveyor means by removing the liquid at said entrance station and returning a quantity of liquid to said tank at said exit station, means for replenishing any loss of liquid from said tank, said recirculating means including means external to said tank for counterflowing the liquid in stages from said exit station through said intermediate station and to said entrance station in said opposite direction, means for filtering the liquid removed at said entrance location, and means for heating the replenished liquid to said scalding temperature before being returned to said tank.

2. The system according to claim 1, wherein said immersion tank has a shallow liquid filled head trough at said entrance station, said conveyor means being positioned above said trough for moving poultry in said one direction through said trough while the head only of the poultry is immersed in the trough liquid as it hangs by the legs from said conveyor means.

3. A poultry scalding system comprising, an open immersion tank adapted to contain scalding liquid at a predetermined scald temperature, conveyor means positioned above said tank for moving poultry in one direction through said tank from an entrance station through at least one intermediate station, and to an exit station at said tank while the poultry is immersed in the liquid as the poultry hangs by the legs from said conveyor means, a pipe circuit external to said tank for recirculating substantially all the scalding liquid in a direction opposite said one direction during operation of said conveyor means, said circuit being connected to said tank for removing the liquid at the entrance station, means external to said tank for counterflowing the liquid in stages from said exit station through said intermediate station and to said entrance station in said opposite direction, means for supplying unheated add-on liquid to the removed liquid to form recirculated liquid, means for heating the recirculated liquid to the scald temperature, and said circuit being connected to said tank for returning the recirculated liquid to said tank at said exit station.

4. The system according to claims 1 or 3, wherein said heating means includes steam injection means connected to said counterflowing means external to said tank to maintain the temperature of the scalding liquid in said tank at a predetermined scald temperature.

5. The system according to claim 3, wherein said immersion tank has a shallow liquid containing head trough at said entrance station, said conveying means being located above said trough for moving the poultry through the trough while immersing only the heads of the poultry in the trough liquid as the poultry, hangs by the legs.

6. The system according to claims 1 or 3, wherein said external means comprise means for pumping the liquid from and into said exit station and into said intermediate station, from and into said intermediate station and into said entrance station, and from and into said entrance station and outwardly of said tank.

7. The system according to claim 6, wherein said tank has internal wall means defining at least one chamber into which the liquid is pumped at said stations by said pumping means, said tank other than said chamber defining a trough in communication with said chamber and along which the poultry is moved in said one direction.

8. The system according to claim 7, wherein said tank has side and end walls of a predetermined height, said internal wall means comprising at least one chamber wall of a height less than said predetermined height such that the liquid may flow from said chamber to said trough.

9. The system according to claim 7, wherein said chamber has transverse divider walls defining a plurality of chamber sections respectfully associated with said stations.

10. The system according to claim 9 wherein said tank has a plurality of said intermediate stations.

11. The system according to claim 6, wherein said heating means include steam injection means connected to said pumping means external to said tank to maintain the temperature of the scalding liquid in said tank at a predetermined scald temperature.

12. A poultry scalding process, comprising the steps of immersing poultry in an open immersion tank adapted to contain scalding liquid at a predetermined scald temperature, the immersing step being carried out by conveying the poultry in one direction through the tank from an entrance station, through at least one intermediate station and to an exit station at said tank while the poultry hangs by the legs, recirculating the scalding liquid in a direction opposite said one direction during poultry conveying by removing the liquid at the entrance station, supplying unheated add-on liquid to the removed liquid to form recirculated liquid, heating the recirculated liquid to the scald temperature and returning the heated recirculated liquid to said tank at said exit station, the recirculating step including counterflowing the liquid in stages, by means external to the tank, from said exit station through said intermediate station and toward said entrance station in said opposite direction.

13. The process according to claim 12, further comprising the step of providing said tank with a shallow liquid containing head trough at said entrance station, and conveying the poultry in said one direction through said trough while immersing the head only of the poultry in the trough liquid as the poultry hangs by the legs.

14. The process according to claim 12, wherein said counterflowing is carried out by pumping the liquid from and into the exit station and into the intermediate station, pumping the liquid from and into the intermediate station and into the entrance station, and pumping the liquid from and into the entrance station and outwardly of the tank.

15. The process according to claim 14, wherein the liquid is pumped into at least one chamber of said tank at said stations, the poultry being conveyed in said one direction along a trough defined in the tank adjacent the chamber.

16. The process according to claim 15, wherein the liquid flows over a wall of said chamber into said trough.

17. The process according to claim 16, wherein the liquid is pumped into a plurality of chamber section of said tank respectively associated with said stations.

18. The process according to claim 17, wherein the poultry is conveyed in said one direction through a plurality of intermediate stations.

19. A poultry scalder comprising, an open immersion tank adapted to contain scalding liquid, said tank having internal wall means defining at least one chamber, said tank other than said chamber defining a trough in communication with said chamber, said trough being adapted for immersing poultry conveyed in one direction therealong, and means mounted externally to said tank for counterflowing the liquid in stages in a direction opposite said one direction.

20. The scalder according to claim 19, wherein said tank has poultry exit and entrance stations and an intermediate station, said counterflowing means comprising a plurality of pumps connected to both said trough and said chamber for pumping the liquid from and into said exit station and into said intermediate station, from and into said intermediate station and into said entrance station, and from and into said entrance station and outwardly of said tank.

21. The scalder according to claim 19, wherein said tank has side walls of a predetermined height, and said internal wall means comprising at least one chamber wall of a height less than said predetermined height.

22. The scalder according to claim 20, wherein said tank has transverse divider walls defining a plurality of chamber sections respectively associated with said stations.

23. The scalder according to claim 21, wherein said tank has at least one partition wall of substantially the same height as said side walls and parallel thereto, said internal wall means defining chambers with one of said side wall and with said partition wall.

* * * * *